United States Patent
Sugihara

(10) Patent No.: US 10,601,065 B2
(45) Date of Patent: Mar. 24, 2020

(54) METHOD FOR MANUFACTURING BATTERY

(71) Applicant: TOYOTA JIDOSHA KABUSHIKI KAISHA, Toyota-shi, Aichi (JP)

(72) Inventor: Atsushi Sugihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 15/862,919

(22) Filed: Jan. 5, 2018

(65) Prior Publication Data
US 2018/0219249 A1 Aug. 2, 2018

(30) Foreign Application Priority Data
Jan. 27, 2017 (JP) .................. 2017-013026

(51) Int. Cl.
| | | |
|---|---|---|
| H01M 2/00 | (2006.01) | |
| H01M 10/04 | (2006.01) | |
| H01M 2/14 | (2006.01) | |
| H01M 2/02 | (2006.01) | |
| H01M 2/16 | (2006.01) | |
| H01M 4/04 | (2006.01) | |
| H01M 4/62 | (2006.01) | |

(52) U.S. Cl.
CPC ......... H01M 10/0418 (2013.01); H01M 2/02 (2013.01); H01M 2/14 (2013.01); H01M 2/1673 (2013.01); H01M 4/0404 (2013.01); H01M 4/0435 (2013.01); H01M 4/622 (2013.01)

(58) Field of Classification Search
CPC .......... H01M 10/0418; H01M 2/1673; H01M 4/0435; H01M 4/0404; H01M 4/622; H01M 2/02; H01M 2/14
See application file for complete search history.

(56) References Cited

U.S. PATENT DOCUMENTS

| | | | |
|---|---|---|---|
| 6,136,471 A | 10/2000 | Yoshida et al. | |
| 2017/0018777 A1 | 1/2017 | Umeyama et al. | |

FOREIGN PATENT DOCUMENTS

| | | |
|---|---|---|
| JP | H10-233232 A | 9/1998 |
| JP | 2002-015773 A | 1/2002 |
| JP | 2011-023186 A | 2/2011 |
| JP | 2015-201318 A | 11/2015 |
| JP | 2016-219212 A | 12/2016 |
| JP | 2017-022019 A | 1/2017 |
| KR | 10-2014-0099709 A | 8/2014 |

*Primary Examiner* — Nicholas P D'Aniello
(74) *Attorney, Agent, or Firm* — Oliff PLC

(57) ABSTRACT

The present invention provides a method for manufacturing a battery which includes a granulation step (Step S1) of mixing at least an active material, a binder, and a solvent to form wet granulated particles, a deposition step (Step S2) of subjecting the wet granulated particles to a forming process to form an active material layer on a current collector, a rolling step (Step S3) of placing a separator on a surface of the active material layer and rolling the separator before the wet granulated particles on the current collector are dried, to obtain a laminated body in which the current collector, the active material layer, and the separator are stacked in this order and closely attached to each other, a drying step (Step S4) of drying the laminated body to provide an integrated laminated body, and a fabrication step (Step S5) of fabricating a battery using the integrated laminated body.

9 Claims, 1 Drawing Sheet

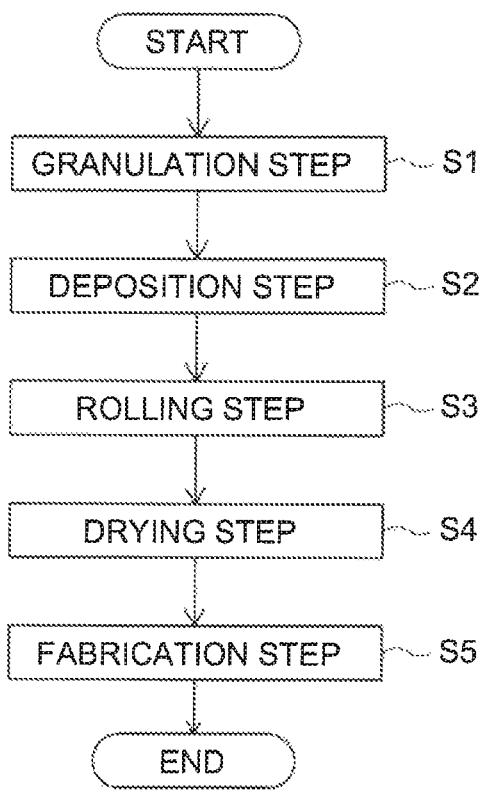

METHOD FOR MANUFACTURING BATTERY

CROSS REFERENCE TO RELATED APPLICATIONS

The present application claims priority to Japanese Patent Application No. 2017-013026, filed on Jan. 27, 2017, the entire content of which is incorporated herein by reference.

BACKGROUND OF THE INVENTION

1. Field of the Invention

The present invention relates to a method for manufacturing a battery.

2. Description of the Related Art

Batteries such as a lithium ion secondary battery have been studied for further performance improvements. As a prior art technique related thereto, Japanese Patent Application Publication No. 2011-23186 discloses a separator for an electrochemical element. The separator has an adhesive resin layer which is melted by heating to show an adhesive property. According to the technique disclosed in Japanese Patent Application Publication No. 2011-23186, a positive electrode, a separator, and a negative electrode are stacked in this order and hot-pressed. This integrates at least one of the positive and negative electrodes with the separator via an adhesive resin layer. As a result, even when charging/discharging is repeated, the distance between the positive electrode and the negative electrode is less likely to vary to allow an improvement in charge/discharge cycle characteristic.

However, the technique disclosed in Japanese Patent Application Publication No. 2011-23186 requires the steps of forming the adhesive resin layer on the surface of the separator, specifically the steps of preparing a slurry for forming the adhesive resin layer, applying the slurry, and drying the applied slurry. As a result, a problem arises in that the number of steps increases to significantly reduce productivity. In addition, since the separator disclosed in Japanese Patent Application Publication No. 2011-23186 has the adhesive resin layer, the entire thickness of the separator increases. This may increase resistance and degrade battery performance, e.g., an input/output density.

SUMMARY OF THE INVENTION

The present invention has been achieved in view of such circumstances and an object thereof is to efficiently manufacture a battery having excellent battery performance.

The present invention provides a method for manufacturing a battery which includes a granulation step of mixing at least an active material, a binder, and a solvent to form a plurality of wet granulated particles, a deposition step of subjecting the plurality of wet granulated particles to a forming process to form an active material layer on a current collector, a rolling step of placing a separator on a surface of the active material layer and rolling the separator before the wet granulated particles on the current collector are dried, to obtain a laminated body in which the current collector, the active material layer, and the separator are stacked in this order and closely attached to each other, a drying step of drying the laminated body to provide an integrated laminated body, and an fabrication step of fabricating a battery using the integrated laminated body.

According to the manufacturing method, it is possible to omit the step of forming an adhesive resin layer on the surface of the separator and achieve a further reduction in the number of process steps than achieved by the technique disclosed in Japanese Patent Application Publication No. 2011-23186. Also, the rolling step allows the task of increasing the density of the active material layer and the task of closely attaching the separator to the active material layer using a binder with which the wet granulated particles are impregnated to be simultaneously performed. In addition, according to the manufacturing method, it is possible to inhibit the entire thickness of the separator from being excessively increased and achieve a further reduction in the resistance of the battery than achieved by the technique disclosed in Japanese Patent Application Publication No. 2011-23186. Thus, the manufacturing method allows the battery with excellent battery performance to be efficiently manufactured.

Note that Japanese Patent Application Publication No. 2015-201318 discloses a method for manufacturing an electrode using a so-called wet powder deposition method. Specifically, the disclosed method for manufacturing the electrode includes the steps of mixing an active material and a binder into a solvent to form wet granulated particles and subjecting the wet granulated particles to a forming process to form an active material layer on a current collector.

In a preferred aspect of the present invention, the binder includes a rubber. When a total solid content of the wet granulated particles is 100 mass %, a content of the rubber based on the total solid content of the wet granulated particles is set to 0.5 mass % or more. This can appropriately enhance adhesion between the current collector and the active material layer and/or adhesion between the active material layer and the separator.

In another preferred aspect of the present invention, the binder includes a rubber. When a total solid content of the wet granulated particles is 100 mass %, a content of the rubber based on the total solid content of the wet granulated particles is set to 1.0 mass % or less. This can further reduce the resistance.

BRIEF DESCRIPTION OF THE DRAWINGS

FIG. 1 is a flow chart showing a manufacturing method according to an embodiment.

DETAILED DESCRIPTION OF THE PREFERRED EMBODIMENTS

The following will describe preferred embodiments of the present invention. It should be noted that matters necessary for carrying out the present invention other than those specifically referred to in the present specification are understood to be matters of design for a person skilled in the art based on the prior art in this field. The present invention can be carried out on the basis of the content disclosed in the present specification and common technical knowledge in this field. Note that, in the present specification, the wording "A to B (A and B are arbitrary values)" is assumed to include the values (lower and upper limit values) of A and B.

Method for Manufacturing Battery

FIG. 1 is a flow chart of a manufacturing method according to an embodiment. The method for manufacturing a battery according to the present embodiment includes the following five steps of: (Step S1) a granulation step; (Step S2) a deposition step; (Step S3) a rolling step; (Step S4) a drying step; and (Step S5) a fabrication step.

The following will specifically describe the technique disclosed herein using, as an example, the case of fabricating a battery using a laminated body in which a negative electrode and a separator are integrated and a single independent positive electrode (i.e., positive electrode not integrated with the separator). However, it is not intended to particularly limit the present invention to the specific description.

Step S1 Granulation Step

In a granulation step in the present embodiment, at least a negative electrode active material, a negative electrode binder, and a solvent are stirred/mixed to form negative electrode wet granulated particles. In other words, at least the negative electrode active material, the negative electrode binder, and the solvent are aggregated and integrated into particulate shapes.

For the stirring/mixing, a conventionally known granulation device such as a granulation device as described in, e.g., Japanese Patent Application Publication No. 2015-201318 can be used. The granulation device described in Japanese Patent Application Publication No. 2015-201318 includes a stirring tank and a stirring vane rotatably disposed therein. In the granulation device, granulation is performed by loading materials into the stirring tank and rotating the stirring vane.

As the negative electrode active material, one or two or more of various materials known to be usable for the negative electrode of a battery can be used without being particularly limited. Preferred examples of the negative electrode active material include a graphite-based material such as natural graphite, synthetic graphite, or amorphous carbon-coated graphite (in a form in which the surfaces of graphite particles are coated with amorphous carbon). Note that, in the present specification, the "graphite-based material" is an inclusive term of a material containing generally 50 mass % or more and typically 80 mass % or more of graphite based on the total mass of the negative electrode active material.

The negative electrode active material has particulate shapes. An average particle diameter (particle diameter corresponding to 50% in the volume-based cumulative particle diameter distribution based on a laser diffraction/scattering method, which holds true hereinafter) of the negative electrode material may appropriately be typically 1 to 50 μm, e.g., 5 to 20 μm.

The negative electrode binder has a first function of closely attaching the negative electrode active material layer to the surface of a negative electrode current collector in the deposition step of Step S2, a second function of closely attaching the separator to the surface of the negative electrode active material layer in the rolling step of Step S3, and a third function of fixing the negative electrode current collector, the negative electrode active material layer, and the separator to each other to provide an integrated body in the drying step of Step S4. Preferably, the negative electrode binder has both the property of adherently bonding the negative electrode current collector, the negative electrode active material layer, and the separator to each other at a room temperature (25±10° C., e.g., 25±5° C.) and the property of fixing the negative electrode current collector, the negative electrode active material layer, and the separator to each other at a temperature (e.g., 40° C. to 150° C.) higher than the room temperature.

As the negative electrode binder, one or two or more of various materials known to be usable to form the negative electrode active material layer can be used without being particularly limited. Preferred examples of the negative electrode binder include rubbers such as styrene-butadiene rubber (SBR), acrylonitrile-butadiene copolymer rubber (NBR), and acrylonitrile-butadiene-isoprene copolymer rubber (NBIR), cellulose-based polymers such as carboxymethyl cellulose (CMC) and methyl cellulose (MC), halogenated vinyl resins such as polyvinylidene fluoride (PVdF) and polytetrafluoroethylene (PTFE), and polyalkylene oxides such as polyethylene oxide (PEO). Among them, any of the rubbers and the cellulose-based polymers can be used appropriately. Among the rubbers, a diene-based rubber having a double bond in the main chain thereof, e.g., a butadiene-based rubber containing 50 mol % or more of butadiene based on the total composition is preferred.

In terms of well balancing the first to third functions with each other, two or more different types are preferably used in combination as the negative electrode binder. Preferred examples of the combination include a combination of a rubber and a cellulose-based polymer. The content ratio between the rubber and the cellulose-based polymer may appropriately satisfy, e.g., Rubber:Cellulose-Based Polymer=1:2 to 2:1.

An amount of the negative electrode binder to be added can be determined appropriately depending on the property of the negative electrode active material, the type of the negative electrode binder, or the like so as to allow the first to third functions to be performed appropriately. In a preferred example, the amount of the negative electrode binder to be added is set to generally 0.5 parts by mass or more, e.g., 1 part by mass or more and generally 10 parts by mass or less and typically 5 parts by mass or less, e.g., 3 parts by mass or less based on 100 parts by mass of the negative electrode active material. In another preferred example, the amount of the rubber to be added is set to generally 0.1 to 5 parts by mass, e.g., 0.5 to 1 parts by mass based on 100 parts by mass of the negative electrode active material. This allows the effects of the technique disclosed herein to be achieved at a higher level.

By setting the amount of the negative electrode binder to be added to a predetermined value or more, it is possible to enhance the formability of the negative electrode active material layer and the adhesion between the negative electrode active material layer and the negative electrode current collector in the deposition step of Step S2. In addition, the effect of allowing easier sticking of the separator to the surface of the negative electrode active material layer in the rolling step of Step S3 is also obtained. Moreover, in the drying step of Step S4, it is possible to improve the integrity between the negative electrode current collector, the negative electrode active material layer, and the separator as well as a shape retaining property. On the other hand, by setting the amount of the negative electrode binder to be added to a predetermined value or less, the resistance can further be reduced.

The solvent is not particularly limited and can be used appropriately depending on, e.g., the type and property of the binder in use. As the solvent, e.g., an aqueous solvent such as ion-exchanged water or an organic solvent such as N-methyl-2-pyrolidone (NMP) can be used. Note that, in the present specification, the "aqueous solvent" refers to a solvent containing generally 80 mass % or more, e.g., 95 mass % or more of water based on the total composition. The present step may be performed at a temperature lower than the boiling point of the solvent, which is typically 40° C. or less, e.g., a room temperature (25±10° C., e.g., 25±5° C.).

The negative electrode wet granulated particles in the present embodiment contain at least the negative electrode active material, the negative electrode binder, and the solvent. The negative electrode wet granulated particles may also contain another component as an additive in addition to these components. Examples of the component that can be contained as an additive include a dispersant and a conductive material.

An average particle diameter of the negative electrode wet granulated particles is not particularly limited. Typically, the negative electrode wet granulated particles are in the form of an aggregate in which a plurality of negative electrode active material particles are combined with each other via the binder. The average particle diameter of the negative electrode wet granulated particles is typically larger than the average particle diameter of the individual negative electrode active material particles. In a preferred embodiment, the average particle diameter of the negative electrode wet granulated particles is generally 100 μm or more and typically 200 μm or more, e.g., 500 μm or more and generally 5000 μm or less and typically 2000 μm or less, e.g., 1000 μm or less. This can enhance the formability of the negative electrode active material layer, e.g., processing ease and the planarity of the surface of the negative electrode active material layer in step S2.

A shape of each of the negative electrode wet granulated particle is not particularly limited. In a preferred embodiment, the negative electrode wet granulated particle has a generally spherical shape. Note that, in the present specification, the "generally spherical shape" means that the aspect ratio (the ratio of the major-axis length of a minimum rectangle externally tangent to the particle to the minor-axis length thereof) is generally 1 to 2, e.g., 1 to 1.5.

A solid content ratio (non-volatile (NV) value) of the negative electrode wet granulated particles is not particularly limited.

In a preferred example, the solid content ratio of the negative electrode wet granulated particles is generally 65 mass % or more and preferably 70 mass % or more, e.g., 75 mass % or more. The value of the solid content ratio is relatively large compared to that of a slurry compound used in a coating method as a typical method for forming a negative electrode active material layer. By setting the solid content ratio to a predetermined value or more, it is possible to impart a high shearing force to each of the negative electrode active material and the negative electrode binder. This allows the negative electrode active material and the negative electrode binder to be uniformly dispersed. This also achieves the effect of allowing easy sticking of the separator to the surface of the negative electrode active material layer in the rolling step of Step S3. This also achieves the effect of reducing a drying period in the drying step of Step S4.

In another preferred embodiment, the solid content ratio of the negative electrode wet granulated particles is generally 95 mass % or less and typically 90 mass % or less, e.g., 85 mass % or less. By setting the solid content ratio to a predetermined value or less, it is possible to appropriately integrate the negative electrode active material, the negative electrode binder, and the solvent with each other to form granulated particles in a so-called crumbled state. In addition, in the deposition step of Step S2, it is possible to enhance the formability of the negative electrode active material layer and the adhesion between the negative electrode active material layer and the negative electrode current collector. The effect of allowing easy sticking of the separator to the surface of the negative electrode active material layer in the rolling step of Step S3 can also be obtained.

A content of the negative electrode active material based on a total solid content of the negative electrode wet granulated particles may appropriately be generally 50 mass % or more and typically 90 mass % or more, e.g., 95 mass % or more and generally 99.5 mass % or less, e.g., 99 mass % or less. A content of the negative electrode binder based on the total solid content of the negative electrode wet granulated particles may appropriately be generally 0.5 mass % or more, e.g., 1 mass % or more and generally 5 mass % or less, e.g., 2 mass % or less. When the negative electrode wet granulated particles contain additive components other than the negative electrode active material and the negative electrode binder, a content of the total additive components may appropriately be generally 10 mass % or less and typically 5 mass % or less.

Step S2 Deposition Step

In the deposition step in the present embodiment, the negative electrode wet granulated particles obtained in the granulation step of Step S1 is subjected to a forming process to form the negative electrode active material layer on the negative electrode current collector. As the negative electrode current collector, a foil made of a metal (e.g., copper) having a high conductivity can be used.

In forming the negative electrode active material layer, a conventionally known deposition device, e.g., such a deposition/transfer device as described in Japanese Patent Application Publication No. 2015-201318 can be used.

The deposition/transfer device described in Japanese Patent Application Publication No. 2015-201318 includes three rolls supported on a rotation shaft and configured to be rotatable. The three rolls are arranged in a predetermined direction. In the deposition/transfer device, when the negative electrode wet granulated particles are supplied between the first and second facing rolls, the two rolls rotate in opposite directions so that the negative electrode wet granulated particles are pressed between the two rolls. Thus, the negative electrode wet granulated particles are combined together, rolled to extend, and formed into a film shape. The third roll supports the negative electrode current collector. The negative electrode wet granulated particles formed into the film shape are transferred by the second roll and pressed against the negative electrode current collector supported on the third roll. As a result, the negative electrode active material layer made of the negative electrode wet granulated particles is formed on the negative electrode current collector.

The present step may be performed at a temperature lower than the boiling point of the solvent used in Step S1, which is typically 40° C. or less, e.g., a room temperature (25±10° C., e.g., 25±5° C.). This allows the solid content ratio of the negative electrode wet granulated particles in Step S1 to be excellently maintained even in the negative electrode active material layer. In other words, the solid content ratio of the negative electrode active material layer formed in the present step is preferably the same as that of the negative electrode wet granulated particles in Step S1.

Step S3 Rolling Step

In the rolling step in the present embodiment, the separator is placed on the surface of the negative electrode active material layer, and the negative electrode current collector, the negative electrode active material layer, and the separator are rolled together, before the negative electrode active material layer (specifically, the negative electrode wet granulated particles) on the negative electrode current collector is dried. This allows the separator to be closely attached (preferably, adherently bonded) to the surface of the negative electrode active material layer using the binder with which the negative electrode wet granulated particles are impregnated in Step S1. This also allows a density of the negative electrode active material layer to be simultaneously enhanced. In addition, it is possible to remove the warping of the negative electrode active material layer as well as wrinkle in the separator. As a result, it is possible to obtain a laminated body in which the negative electrode current collector, the negative electrode active material layer having an intended density, and the separator are stacked in this order and closely attached to each other.

For the rolling, a conventionally known press machine, e.g., a roll press machine or a flat press machine can be used.

As the separator, any separator known to be usable for a battery can be used without being particularly limited. Preferred examples of the separator include a porous sheet made of a resin such as polyethylene (PE), polypropylene (PP), polyester, cellulose, or polyamide. In particular, a polyolefin-based porous sheet containing 50 mass % or more of a polyolefin resin based on the total composition is preferred. The separator may have either a single-layer structure or a multi-layer structure. The separator may also include a porous heat resistant layer containing an inorganic filler. Preferably, the separator does not include an adhesive resin layer as described in Japanese Patent Application Publication No. 2011-23186, i.e., a layer containing an adhesive resin which shows an adhesive property when heated.

Preferably, a total thickness of the separator is generally 5 to 50 μm, e.g., 10 to 30 μm. This can appropriately provide insulation between the positive electrode and the negative electrode. This can also reduce the resistance and further improve the battery performance.

Note that, in the present specification, the wording "the negative electrode wet granulated particles are dried" means that the amount of the solvent contained in the negative electrode wet granulated particles becomes 2000 ppm or less. Accordingly, when the content of the solvent is within the range shown above, it is also acceptable to allow the laminated body to stand at a room temperature of, e.g., 15° C. to 35° C. for a predetermined period (e.g., 3 hours or less and preferably 1 hour or less) without continuously performing the present step after Step S2. Note that an amount of the solvent can be measured by gas chromatography.

In a preferred example, the separator is placed on the surface of the negative electrode active material layer in a state where the solid content ratio of the negative electrode wet granulated particles is generally 70 mass % or more and typically 75 mass % or more, e.g., 85 mass % or more. In another preferred example, the separator is placed on the surface of the negative electrode active material layer in a state where, when the total amount of the solvent contained in the negative electrode wet granulated particles in Step S1 is 100 mass %, the amount of the remaining solvent is generally 10 mass % or more and preferably 50 mass % or more, e.g., 80 mass % or more. This allows the separator to be more closely attached to the negative electrode active material layer.

Conditions when the laminated body is rolled may be adjusted appropriately such that, e.g., the negative electrode active material layer has an intended property (e.g., density). For example, when the negative electrode used in a high-capacity-type battery having a battery capacity of 20 Ah or more is to be pressed using a roll press machine, a roll linear load may be set appropriately to about 1 to 2 t/cm. The temperature of the rolls during the rolling may be either a room temperature (25±10° C., e.g., 25±5° C.) or a high temperature of about 40° C. to 150° C., e.g., 50° C. to 150° C.). By setting the temperature of the rolls to the room temperature, productivity and cost can further be reduced. By setting the temperature of the rolls higher than the room temperature, a drying period in Step S4 can be reduced.

The density of the negative electrode active material layer after the rolling is not particularly limited. In a preferred example, in terms of achieving both a high energy density and a high input/output density, it is preferable that the density of the negative electrode active material layer is generally 0.7 g/cm$^3$ or more, e.g., 1.0 g/cm$^3$ or more and generally 2.0 g/cm$^3$ or less, e.g., 1.5 g/cm$^3$ or less.

Step S4 Drying Step

In the drying step in the present embodiment, the laminated body obtained in Step S3, i.e., the laminated body in which the negative electrode current collector, the negative electrode active material layer, and the separator are stacked in this order and closely attached to each other is dried. In other words, the negative electrode current collector, the negative electrode active material layer, and the separator are collectively (simultaneously) dried. This can remove the solvent from the negative electrode wet granulated particles and set the amount of the solvent contained in the negative electrode active material layer to a predetermined value or less (e.g., 2000 ppm or less). At the same time, it is possible to fix the negative electrode current collector, the negative electrode active material layer, and the separator to each other using the binder with which the negative electrode wet granulated particles are impregnated in Step S1 and provide an integrated laminated body.

For the drying, a conventionally known drying furnace can be used. As a drying method, such a method as, e.g., draught drying, heat drying, or vacuum drying can be used. For example, when heat drying is used, a heating temperature may appropriately be set to generally 50° C. to 150° C., e.g., 70° C. to 120° C. In terms of efficiently removing the solvent, the present step may appropriately be performed at a temperature higher than in Steps S1 and S2. The temperature in the present step may be higher or lower than in Step S3 or the same as in Step S3.

Step S5 Fabrication Step

In the fabrication step in the present embodiment, using the integrated laminated body obtained in Step S4, a battery is fabricated. Specifically, first, a positive electrode is prepared. Next, the positive electrode is placed on the surface of the laminated body closer to the separator to form an electrode body. The laminated body in Step S4 typically has a belt-like shape. In the present step, the belt-like laminated body may be used as it is without alteration or used after being cut into the form of a rectangular flat plate. For example, a wound electrode body can be produced by stacking a belt-like laminated body and a belt-like positive electrode and winding the resulting laminated body in a longitudinal direction. Also, for example, a laminated electrode body can be produced by stacking a laminated body in the form of a rectangular flat plate and a positive electrode in the form of a rectangular flat plate. In the production of a high-capacity-type laminated electrode body, a laminated body in the form of a rectangular flat plate and a positive electrode in the form of a rectangular flat plate are alternately stacked a plurality of times. At this time, by using the foregoing laminated body in which the negative electrode current collector, the negative electrode active material layer, and the separator are integrated, compared to the case where a positive electrode, a separator, and a negative electrode which are discrete and separate from each other are stacked, the productivity can be improved. That is, in a mode of implementation in which the laminated electrode body is produced, the effects of the technique disclosed herein can more remarkably be achieved.

Typically, the positive electrode includes a positive electrode current collector and a positive electrode active material layer fixed onto the positive electrode current collector. As the positive electrode current collector, a foil made of a metal (e.g., aluminum) having a high conductivity can be used. The positive electrode active material layer contains a positive electrode active material. As the positive electrode active material, one or two or more of various materials known to be usable for the positive electrode of a battery can be used without being particularly limited. Preferred examples of the positive electrode active material include a lithium-transition metal composite oxide such as a lithium-nickel-cobalt-manganese composite oxide. The positive electrode active material layer may also contain a component other than the positive electrode active material such as, e.g., a conductive material or a binder. Examples of the conductive material include a carbon material such as acetylene black. Examples of the binder include a halogenated vinyl resin such as polyvinylidene fluoride (PVdF).

Next, the electrode body and an electrolyte are contained in a battery case. Examples of the battery case include a battery case made of a metal such as aluminum.

Typically, the electrolyte contains a support salt and a solvent. Examples of the support salt in the case of fabricating a lithium ion secondary battery include a lithium salt such as, e.g., $LiPF_6$ or $LiBF_4$. Examples of the solvent include an aprotic non-aqueous solvent such as a carbonate, an ester, or an ether. Specific examples of the carbonate include ethylene carbonate (EC), diethyl carbonate (DEC), dimethyl carbonate (DMC), and ethyl methyl carbonate (EMC). The electrolyte may also contain various additives such as, e.g., a thickener, a dispersant, a film former, and a gas generator in addition to the support salt and the non-aqueous solvent. The electrolyte may also be a non-aqueous electrolytic solution which is in the form of a liquid in an environment in which the battery is used (environment at a temperature of, e.g., −20° C. to +60° C.).

In this manner, the battery including the electrode body in which the positive and negative electrodes face each other with the separator being interposed therebetween and the electrolyte can be manufactured. In the battery disclosed herein, at least one of the positive and negative electrodes contains the active material and the binder. The separator and at least one of the positive and negative electrodes are integrally configured via the binder.

The battery disclosed herein can be used for various applications. Preferred examples of the applications include a driving power supply mounted in a vehicle such as an electric vehicle (EV), a hybrid vehicle (HV), or a plug-in hybrid vehicle (PHV).

The following will describe several embodiments related to the present invention, but it is not intended to limit the present invention to such specific examples.

EXAMPLES 1 TO 5

First, for each of examples, natural graphite (C) as a negative electrode active material and each of styrene butadiene rubber (SBR) and carboxymethyl cellulose (CMC) as a binder were dry-mixed such that a mass ratio thereamong satisfied C:SBR:CMC=99:(X in Table 1):(Y in Table 1). Next, the resulting mixture and ion-exchanged water as a solvent were loaded into a granulation device and stirred/mixed to form negative electrode wet granulated particles having a solid content ratio of 70 mass % (granulation step).

Next, the obtained negative electrode wet granulated particles were subjected to a forming process using a deposition/transfer device including three rolls to form negative electrode active material layers over respective negative electrode current collectors (deposition step).

Next, separators were placed on the surfaces of the negative electrode active material layers and rolled using a roll press machine, before the negative electrode wet granulated particles were dried. As the separators, resin separators made of polyethylene were used. As a result, the densities of the negative electrode active material layers were enhanced, while the separators were closely attached to the negative electrode active material layers. Thus, laminated bodies in which the negative electrode current collectors, the negative electrode active material layers, and the separators were stacked in this order and closely attached to each other were obtained (rolling step).

Next, the laminated bodies were dried at 70° C. for 4 hours to fix the negative electrode current collectors, the negative electrode active material layers, and the separators to each other via the negative electrode binder and provide integrated laminated bodies (drying step).

Next, using the integrated laminated bodies, lithium ion secondary batteries were fabricated.

Specifically, first, $LiNi_{1/3}Co_{1/3}Mn_{1/3}O_2$ (NCM) as a positive electrode active material, polyvinylidene fluoride (PVdF) as a binder, and acetylene black (AB) as a conductive material were mixed such that a mass ratio thereamong satisfied NCM:PVdF:AB=93:3:4. Next, the resulting mixture and N-methyl-2-pyrrolidone (NMP) as a solvent were loaded into the granulation device to form positive electrode wet granulated particles having a solid content ratio of 75 mass % (granulation step).

Next, the obtained positive electrode wet granulated particles were subjected to a forming process using the deposition/transfer device to form positive electrode active material layers on positive electrode current collectors (deposition step). By drying the positive electrode active material layers at 70° C. for 4 hours, the positive electrodes were obtained.

Next, the surfaces of the positive electrodes closer to the positive electrode active material layers were caused to face the surfaces of the laminated bodies closer to the separators to produce laminated electrode bodies.

Next, in a solvent mixture including ethylene carbonate (EC), dimethyl carbonate (DMC), and ethylmethyl carbonate (EMC) at a volume ratio satisfying EC:DMC:EMC=30:40:30, $LiPF_6$ as a support salt was dissolved to provide a concentration of 1.0 mol/L and thus prepare a non-aqueous electrolytic solution.

Next, the produced laminated electrode bodies and the prepared non-aqueous electrolytic solution were contained in battery cases, and the battery cases were sealed (fabrication step). Thus, lithium ion secondary batteries in Examples 1 to 5 were assembled. Note that, as shown in Table 1, the lithium ion secondary batteries in Examples 1 to 5 are different only in the content of the binder (specifically, SBR) in the negative electrode wet granulated particles.

REFERENCE EXAMPLE 1

In Reference Example 1, immediately after a negative electrode active material layer was formed over the negative electrode current collector in the same manner as in Example 2, a negative electrode active material layer was dried. Then, by rolling the dried negative electrode using a roll press machine, a negative electrode having the same density as in Examples 1 to 5 was obtained. Next, a positive electrode in a detached state (positive electrode not integrated with a separator), the separator, and the negative electrode (negative electrode not integrated with the separator) were stacked in this order to produce a laminated electrode body. A lithium ion secondary battery was fabricated otherwise in the same manner as in Example 2.

REFERENCE EXAMPLE 2

In Reference Example 2, in accordance with Example 1 in Japanese Patent Application Publication No. 2011-23186, a separator including an adhesive resin layer was produced. Specifically, first, an adhesive resin was applied to the surface of a resin base material made of polyethylene and dried to form an adhesive resin layer. Then, a positive electrode, the separator with the adhesive resin layer, and a negative electrode were stacked in this order to form a laminated electrode body. Note that the separator was placed such that the side thereof closer to the adhesive resin layer faces the negative electrode. Subsequently, the laminated electrode body was hot-pressed to integrate the separator with the negative electrode. A lithium ion secondary battery was fabricated otherwise in the same manner as in Reference Example 1.

Evaluation of Integrity Between Negative Electrode and Separator

With regard to each of Reference Example 2 and Examples 1 to 5, the integrity between the negative electrode and the separator was checked. Specifically, the laminated bodies each having the negative electrode and the separator were inverted with the surface thereof closer to the separator facing downward in the direction of gravity, and it was checked whether or not the separators peeled when the laminated bodies were vertically shaken in this state. Among them, the laminated body from which the separator did not peel was evaluated to be "GOOD", i.e., evaluated to have a satisfactory integrity between the negative electrode active material layer and the separator. On the other hand, the laminated body from which the separator peeled when the laminated body was inverted with the surface thereof closer to the separator facing downward in the direction of gravity was evaluated to be "POOR". Also, the laminated body from which the separator and the negative electrode active material layer partially peeled when the laminated body was shaken was evaluated to be "SLIGHTLY POOR". The result of the evaluation is shown in Table 1. Note that, in Reference Example 1, the negative electrode and the separator were discrete and separate.

Evaluation of IV Resistance

First, each of the obtained lithium ion second batteries was placed in a thermostatic bath at 25° C. and subjected to initial charging/discharging. Specifically, after constant current charging was performed at a charging rate of 0.3 C until the voltage between the positive and negative electrodes became 4.1 V, constant current discharging was performed at a discharging rate of 0.3 C until the voltage between the positive and negative electrodes became 3.0 V. Then, after constant current charging was performed at a charging rate of 0.3 C until a state of charge (SOC) became 30%, each of the batteries was moved to a thermostatic bath at −30° C. and subjected to discharging at a charging rate of 10 C for 10 seconds. Then, the battery voltage was measured, and an IV resistance (mΩ) during the discharging was calculated from a discharge current value and a battery voltage value on the basis of the Ohm's law. The result of the calculation is shown in Table 1.

Productivity/Cost Evaluation

On the basis of the manufacturing method in Reference Example 1, the lithium ion secondary battery manufactured in the process steps larger in number than in Reference Example 1 and/or manufactured in a longer process time was evaluated to be "WORSE". The lithium ion secondary battery manufactured in the same number of process steps and the same process time as in Reference Example 1 was evaluated to be "EQUAL". The lithium ion secondary battery manufactured in the process steps and the process time which are smaller in number and/or shorter than in Reference Example 1 was evaluated to be "GOOD". The result of the evaluation is shown in Table 1.

TABLE 1

| | Negative electrode | | Separator | Integrity between negative electrode and separator | IV resistance (mΩ) | Productivity/ cost |
|---|---|---|---|---|---|---|
| | SBR X (mass %) | CMC Y (mass %) | Adhesive resin layer | | | |
| Reference Example 1 | 0.5 | 0.5 | Absent | (Separate) | 410 | (Reference) |
| Reference Example 2 | 0.5 | 0.5 | Present | Good | 463 | Worse |
| Example 1 | 0.3 | 0.5 | Absent | Slightly poor | 412 | Good |
| Example 2 | 0.5 | 0.5 | Absent | Good | 408 | Good |
| Example 3 | 0.75 | 0.5 | Absent | Good | 415 | Good |
| Example 4 | 1.0 | 0.5 | Absent | Good | 411 | Good |
| Example 5 | 1.5 | 0.5 | Absent | Good | 452 | Good |

First, the lithium ion secondary batteries were comparatively examined in terms of the productivity/cost thereof. Reference Example 2 required the step of forming an adhesive resin layer on the surface of the separator so that the time required for the preparation of the separator was significantly increased compared to that in Reference Example 1. As a result, the productivity deteriorated. On the other hand, in each of Examples 1 to 5, the time required for the steps of fabricating the battery, specifically the required time when the laminated electrode body was produced was significantly reduced compared to that in Reference Example 1. As a result, the productivity improved.

In each of Examples 1 to 4 among Examples 1 to 5, the content of SBR as the negative electrode binder was set to 0.5 mass % or more, and the integrity between the separator and the negative electrode was more satisfactorily maintained.

Next, the lithium ion secondary batteries were comparatively examined in terms of the battery performance thereof (IV resistances). In each of Reference Example 1 and Examples 1 to 5 in which the separator had no adhesive resin layer, the IV resistance was reduced to be lower than in Reference Example 2 in which the separator had the adhesive resin layer. Among them, each of Reference Example 1 and Examples 1 to 4 in which the content of SBR as the negative electrode binder was reduced to 1.0 mass % or less showed the further reduced IV resistance.

As described above, in accordance with the manufacturing method disclosed herein, it is possible to efficiently manufacture a battery having excellent battery performance.

While the present invention has been described in detail heretofore, the embodiment and examples thereof are only illustrative. The invention disclosed herein includes various alternatives and modifications of the specific examples shown above.

For example, in the embodiment described above, the specific description has been given using, as an example, the case of fabricating the battery using the laminated body in which the negative electrode and the separator are integrated and the single independent positive electrode. However, the present invention is not limited thereto. In another example, it may also be possible to fabricate a battery using a laminated body in which a positive electrode and a separator are integrated and a single independent negative electrode. In this case, in Steps S1 to S5 described above, the positive electrode and the negative electrode can be interchanged with each other.

In producing the laminated body in which the positive electrode and the separator are integrated, in, e.g., the granulation step, at least the positive electrode active material, a positive electrode binder, and the solvent are mixed to form the positive electrode wet granulated particles. As the positive electrode binder, a halogenated vinyl resin or polyalkylene oxide can be used appropriately.

In, e.g., the deposition step, the positive electrode wet granulated particles obtained in the granulation step are subjected to a forming process to form the positive electrode active material layer on the positive electrode current collector. As the positive electrode current collector, a foil made of a metal (e.g., aluminum) having a high conductivity can be used.

In, e.g., the rolling step, the separator is placed on the surface of the positive electrode active material layer and rolled, before the positive electrode active material layer (specifically, the positive electrode wet granulated particles) on the positive electrode current collector is dried. The density of the positive electrode active material layer after the rolling can be set to generally 1.5 g/cm$^3$ or more, e.g., 2.0 g/cm$^3$ or more and generally 4.5 g/cm$^3$ or less, e.g., 4.2 g/cm$^3$ or less.

In another example, it is also possible to fabricate a battery using a laminated body in which a positive electrode, a separator, and a negative electrode are integrated in three layers. In this mode of implementation, for example, the manufacturing method may include the step of integrating the positive electrode, the separator, and the negative electrode with each other between the drying step of Step S4 described above and the fabrication step of Step S5. Specifically, the manufacturing method may include the following four steps of: (Step S4-1) a granulation step of mixing at least a positive electrode active material, a positive electrode binder, and a solvent to form positive electrode wet granulated particles; (Step S4-2) a deposition step of subjecting the positive electrode wet granulated particles to a forming process to form a positive electrode active material layer on a positive electrode current collector; (Step S4-3) a rolling step of placing a laminated body integrated in Step S4 with a surface thereof closer to the separator facing a surface of the positive electrode active material layer and rolling the laminated body to obtain a three-layered laminated body in which the positive electrode, the separator, and the negative electrodes are stacked in this order and closely attached to each other, before the positive electrode wet granulated particles are dried; and (Step S4-4) a drying step of drying the three-layered laminated body to provide an integrated laminated body. By integrating the positive electrode, the separator, and the negative electrode with each other, the productivity and battery performance can further be improved.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a battery, comprising the steps of:
    mixing at least an active material, a binder, and a solvent to form a plurality of wet granulated particles;
    subjecting the plurality of wet granulated particles to a forming process to form an active material layer on a current collector;
    placing a separator on a surface of the active material layer and rolling the separator before the wet granulated particles on the current collector are dried, to obtain a laminated body in which the current collector, the active material layer, and the separator are stacked in this order and closely attached to each other;
    drying the laminated body to provide an integrated laminated body; and
    fabricating a battery using the integrated laminated body, wherein the separator is a porous sheet,
    wherein the separator does not include an adhesive layer.

2. The method for manufacturing a battery according to claim 1, wherein the binder includes a rubber, and when a total solid content of the wet granulated particles is 100 mass %, a content of the rubber based on the total solid content of the wet granulated particles is set to 0.5 mass % or more.

3. The method for manufacturing a battery according to claim 1, wherein the binder includes a rubber, and when a total solid content of the wet granulated particles is 100 mass %, a content of the rubber based on the total solid content of the wet granulated particles is set to 1.0 mass % or less.

4. The method for manufacturing a battery according to claim 2, wherein the binder further includes a cellulose-based polymer.

5. The method for manufacturing a battery according to claim 1, wherein, in the granulation step, a solid content ratio of the wet granulated particles is set to 65 mass % or more and 95 mass % or less.

6. The method for manufacturing a battery according to claim 1, wherein, in the rolling step, the separator is placed on the surface of the active material layer in a state where 50 mass % or more of a total amount of the solvent with which the wet granulated particles are impregnated in the granulation step remains.

7. The method for manufacturing a battery according to claim 1, wherein the rolling step is performed at a temperature of 25±10° C.

8. The method for manufacturing a battery according to claim 1, wherein the rolling step is performed at a temperature of 40° C. or more and 150° C. or less.

9. The method for manufacturing a battery according to claim 1, wherein the wet granulated particles are shaped into a larger particulate than the active material.

* * * * *